US006879665B1

(12) United States Patent
Cook et al.

(10) Patent No.: US 6,879,665 B1
(45) Date of Patent: Apr. 12, 2005

(54) METHOD AND APPARATUS FOR SENDING MESSAGES IN A DATA PROCESSING SYSTEM

(75) Inventors: John Andrew Cook, Austin, TX (US); Jianming Dong, Austin, TX (US); John Martin Mullaly, Austin, TX (US); Craig Ardner Swearingen, Austin, TX (US); Alan Richard Tannenbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,320

(22) Filed: Apr. 27, 1999

(51) Int. Cl.[7] ............................................. H04M 1/64

(52) U.S. Cl. ..................... 379/67.1; 379/68; 379/74; 379/88.11; 379/88.12; 379/88.13

(58) Field of Search ................... 379/67.1, 68, 88.07, 379/88.1, 88.11, 88.13, 88.14, 88.17, 93.05, 93.09, 93.17, 93.24, 900, 901

(56) References Cited

U.S. PATENT DOCUMENTS

| | | | |
|---|---|---|---|
| 5,202,961 A | 4/1993 | Mills et al. | 395/159 |
| 5,475,738 A | 12/1995 | Penzias | 379/67 |
| 5,557,659 A * | 9/1996 | Hyde-Thomson | 379/88.13 |
| 5,559,944 A | 9/1996 | Ono | 395/156 |
| 5,568,540 A * | 10/1996 | Greco et al. | 379/88.25 |
| 5,632,002 A | 5/1997 | Hashimoto et al. | 395/2.4 |
| 5,657,045 A | 8/1997 | Ludolph et al. | 345/145 |
| 5,721,827 A * | 2/1998 | Logan et al. | 709/217 |
| 5,742,905 A * | 4/1998 | Pepe et al. | 455/461 |
| 5,793,497 A | 8/1998 | Funk | 358/402 |
| 5,805,167 A | 9/1998 | van Cruyningen | 345/353 |
| 5,809,415 A | 9/1998 | Rossmann | 455/422 |
| 5,818,447 A | 10/1998 | Wolf et al. | 345/335 |
| 5,870,549 A * | 2/1999 | Bobo, II | 395/200.36 |
| 5,944,786 A | 8/1999 | Quinn | 709/206 |

(Continued)

OTHER PUBLICATIONS

Vaudreuil et al., "VPIM Voice Message MIME Sub–Type Registration", RFC 2423, Sep. 1998.
Dawson et al., "Internet Calendaring and Scheduling Core Object Specification (iCalendar)", RFC 2445, Nov. 1998.
Howes et al., "A MIME Content–Type for Directory Information", RFC 2425, Sep. 1998.
Borenstein et al., "MIME (Multipurpose Internet Mail Extensions)," RFC 1341, Jun. 1992.
Borenstein et al., "MIME (Multipurpose Internet Mail Extensions) Part One: Mechanisms for Specifying and Describing the Format of Internet Message Bodies," RFC 1341, Sep. 1993.
Borenstein et al., "MIME (Multipurpose Internet Mail Extensions) Part One: Media Types," RFC 1521, 1522, 1590, Nov. 1996.
Dawson et al., "vCard MIME Directory Profile", RFC 2426, Sep. 1998.

*Primary Examiner*—Allan Hoosain
(74) *Attorney, Agent, or Firm*—Duke W. Yee; Mark S. Walker; Stephen R. Tracs

(57) ABSTRACT

A method and apparatus in a computer for processing voice messages. A voice message is recorded. Responsive to recording of the voice message, an identifying string is automatically inserted into a text message identifying a presence of a voice message. Responsive to recording the voice message, the voice message is automatically appended to a text message to form an appended voice message. The text message is sent with the appended voice message. When a message is received, the text in the received message is parsed to see if an identifying string is present indicating that the received message is a voice message. Responsive to a determination that the received message is a voice message, a graphical user interface including controls for presenting the voice message is displayed.

19 Claims, 7 Drawing Sheets

U.S. PATENT DOCUMENTS

| | | | | |
|---|---|---|---|---|
| 5,951,638 A | * | 9/1999 | Hoss et al. | 709/206 |
| 5,960,404 A | | 9/1999 | Chaar et al. | 705/8 |
| 5,970,475 A | | 10/1999 | Barnes et al. | 705/27 |
| 5,987,140 A | | 11/1999 | Rowney et al. | 380/49 |
| 5,995,756 A | | 11/1999 | Herrmann | 395/712 |
| 5,999,525 A | | 12/1999 | Krishnaswamy et al. | 370/352 |
| 6,002,390 A | | 12/1999 | Masui | 345/173 |
| 6,014,429 A | * | 1/2000 | LaPorta et al. | 379/88.15 |
| 6,021,433 A | | 2/2000 | Payne et al. | 709/219 |
| 6,094,477 A | | 7/2000 | Nada et al. | 379/93.24 |
| 6,112,049 A | * | 8/2000 | Sonnenfeld | 434/350 |
| 6,137,805 A | * | 10/2000 | Berstis | 370/428 |
| 6,177,941 B1 | | 1/2001 | Haynes et al. | 345/352 |
| 6,208,336 B1 | | 3/2001 | Carter | 345/333 |
| 6,233,318 B1 | | 5/2001 | Picard et al. | 379/88.17 |
| 6,246,672 B1 | * | 6/2001 | Lumelsky | 370/310 |
| 6,377,664 B2 | * | 4/2002 | Gerszberg et al. | 379/88.13 |
| 6,408,282 B1 | | 6/2002 | Buist | 703/37 |
| 6,532,230 B1 | * | 3/2003 | Lung et al. | 370/352 |
| 6,697,841 B1 | * | 2/2004 | Sheffield et al. | 709/206 |

* cited by examiner

METHOD AND APPARATUS FOR SENDING MESSAGES IN A DATA PROCESSING SYSTEM

CROSS REFERENCE TO RELATED APPLICATIONS

The present invention is related to applications entitled METHOD AND APPARATUS FOR DISPLAYING CONTROLS IN A GRAPHICAL USER INTERFACE, Ser. No. 09/300,322, A METHOD AND APPARATUS FOR SENDING MESSAGES IN A DATA PROCESSING SYSTEM, Ser. No. 09/300,321, METHOD AND APPARATUS FOR AUTO-EXPANDING AND MANIPULATING DATA FIELDS IN A DATA PROCESSING SYSTEM, Ser. No. 09/300,416, A METHOD AND APPARATUS FOR INTEGRATING ADDRESS BOOKS WITH MOST RECENTLY USED ADDRESS ASSISTANCE, Ser. No. 09/300,317, METHOD AND APPARATUS FOR FILTERING MESSAGES IN A DATA PROCESSING SYSTEM, Ser. No. 09/300,318 and METHOD AND APPARATUS TO ANNOUNCE RECEIPT OF AN ELECTRONIC MESSAGE, Ser. No. 09/300,319, all of which are filed even date hereof, assigned to the same assignee, and incorporated herein by reference.

BACKGROUND OF THE INVENTION

1. Technical Field

The present invention relates to an improved data processing system and in particular to a method and apparatus for sending messages in a data processing system. Still more particularly, the present invention provides a method and apparatus for a custom voice messaging system using legacy mail systems.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of information, entertainment, and communications. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

In addition to being a source of information, the Internet also provides a communications medium. The Internet has become the most popular computer network used by consumers and businesses to send and receive electronic mail, also referred to as "e-mail". The Internet allows users to readily send and receive e-mail to and from computers around the world. Each user typically has a unique Internet e-mail address (e.g., steve@ibm.com). A user with an e-mail account and a computer capable of connecting to the Internet can easily send and receive e-mail over the network.

E-mail allows a person to quickly and easily send textual messages and other information, such as, for example, pictures, sound recordings, and formatted documents electronically to other e-mail users anywhere in the world. An e-mail user will typically create a message using an e-mail program running on a computer connected to a computer network through a modem. The message will include an e-mail "address" for the intended recipient. When the user has finished entering the message, the user may "send" the message to the intended recipient. The e-mail program then electronically transmits the message over the computer network. The recipient, using an e-mail program running on the recipient's computer, can then "receive" the message.

In current electronic mail systems, primary support is provided for content in the form of text with additional support being present for imbedding other types of content, such as audio or voice. Currently, if a user creates a voice message to be sent through e-mail, neither the process of creating the e-mail nor receiving the e-mail is optimized for the particular type of content being sent or received. Currently available e-mail systems treat all e-mail as a single type of document, which may or may not have attachments containing other types of content. Using currently available e-mail systems, the viewing of other types of content requires additional steps, increasing the complexity involved in viewing non-text content.

Thus, it would be advantageous to have an improved method and apparatus for sending messages through an e-mail system.

SUMMARY OF THE INVENTION

The present invention provides a method and apparatus in a computer for processing voice messages. A voice message is recorded. Responsive to recording of the voice message, an identifying string is automatically inserted into a text message identifying a presence of a voice message. Responsive to recording the voice message, the voice message is automatically appended to a text message to form an appended voice message. The text message is sent with the appended voice message. When a message is received, the text in the received message is parsed to see if an identifying string is present indicating that the received message is a voice message. Responsive to a determination that the received message is a voice message, a graphical user interface including controls for presenting the voice message is displayed.

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

Figure 9:
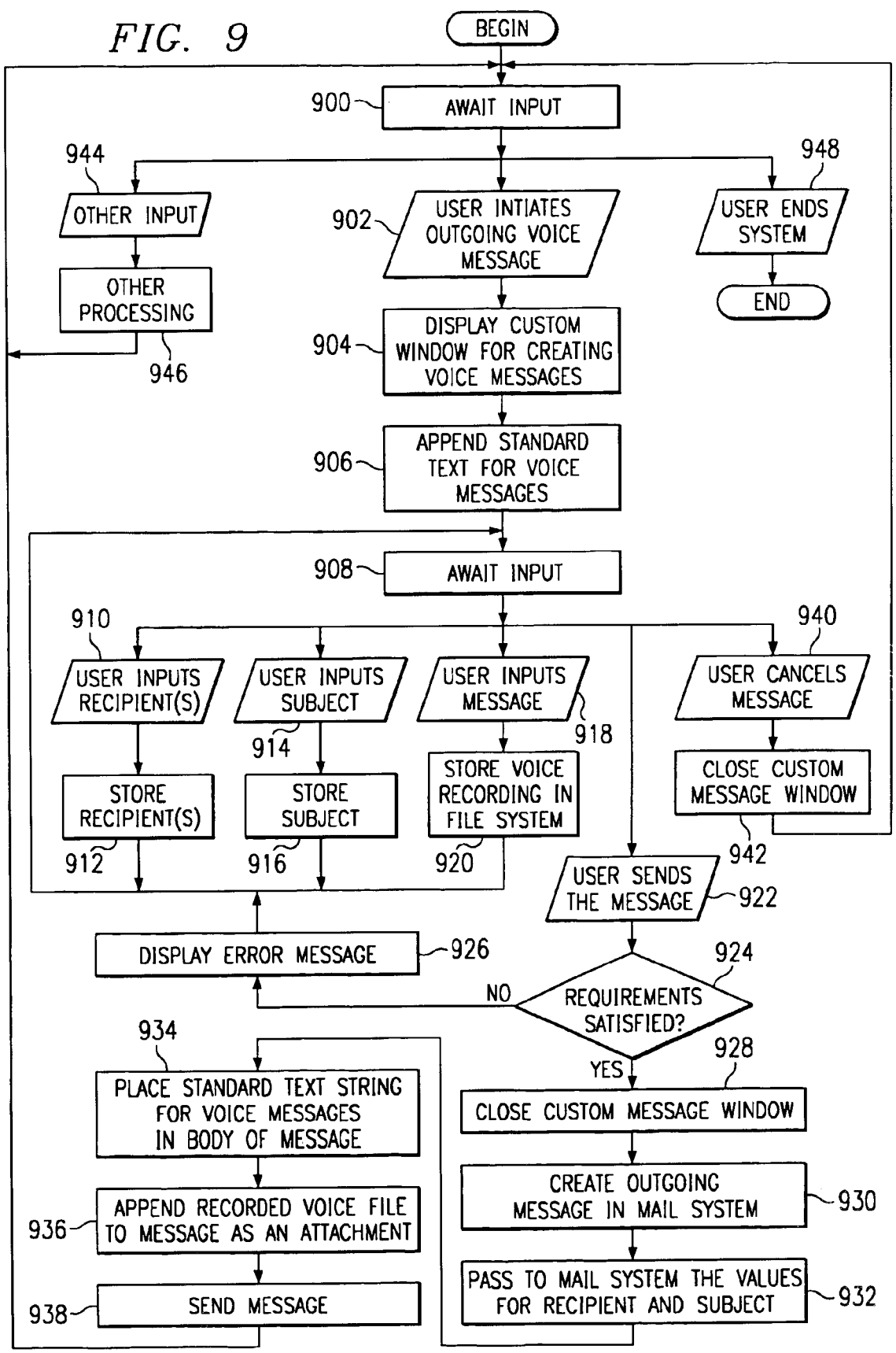
Figure 10:
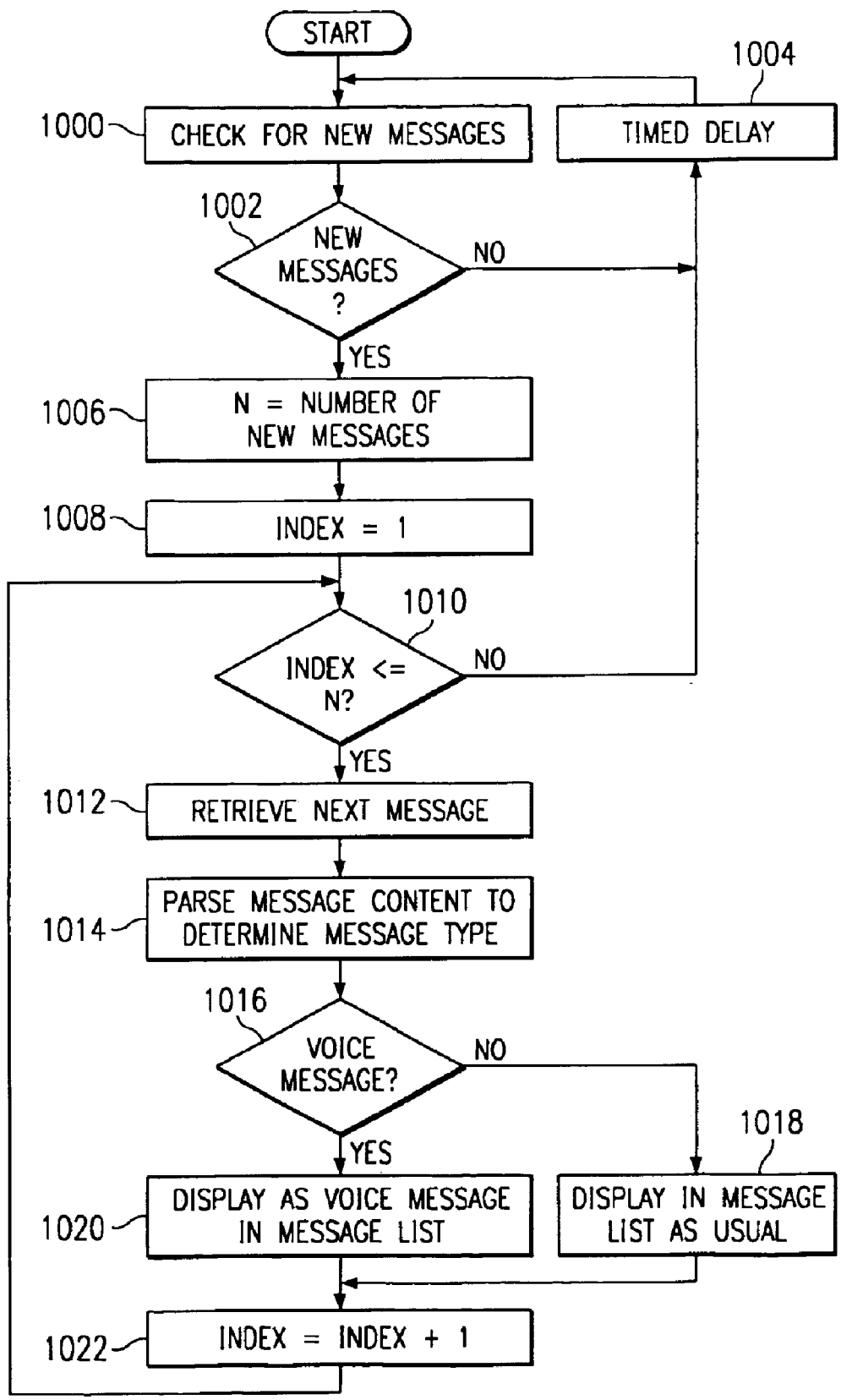
Figure 11:
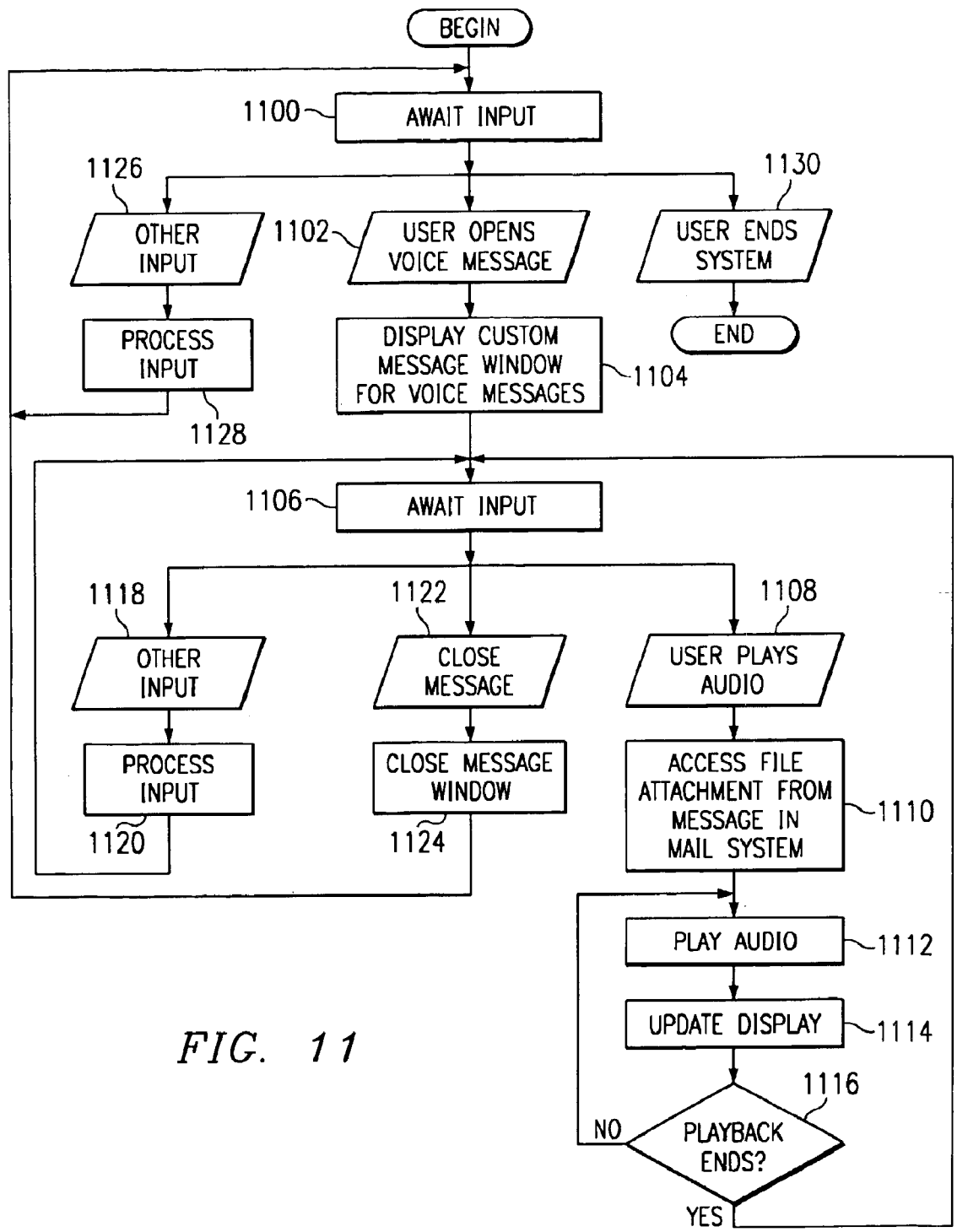

FIGS. 5A, 5B, and 6–8 are diagrams of graphical user interfaces used in sending and receiving customized e-mail messages depicted in accordance with a preferred embodiment of the present invention;

FIG. 9 is a flowchart of a process for creating and sending custom voice messages depicted in accordance with a preferred embodiment of the present invention;

FIG. 10 is a flowchart of a process for receiving custom voice messages depicted in accordance with a preferred embodiment of the present invention; and FIG. 11 is a flowchart of a process for displaying custom voice messages to a user depicted in accordance with a preferred embodiment of the present invention.

DETAILED DESCRIPTION OF THE PREFERRED EMBODIMENT

Figure 1:
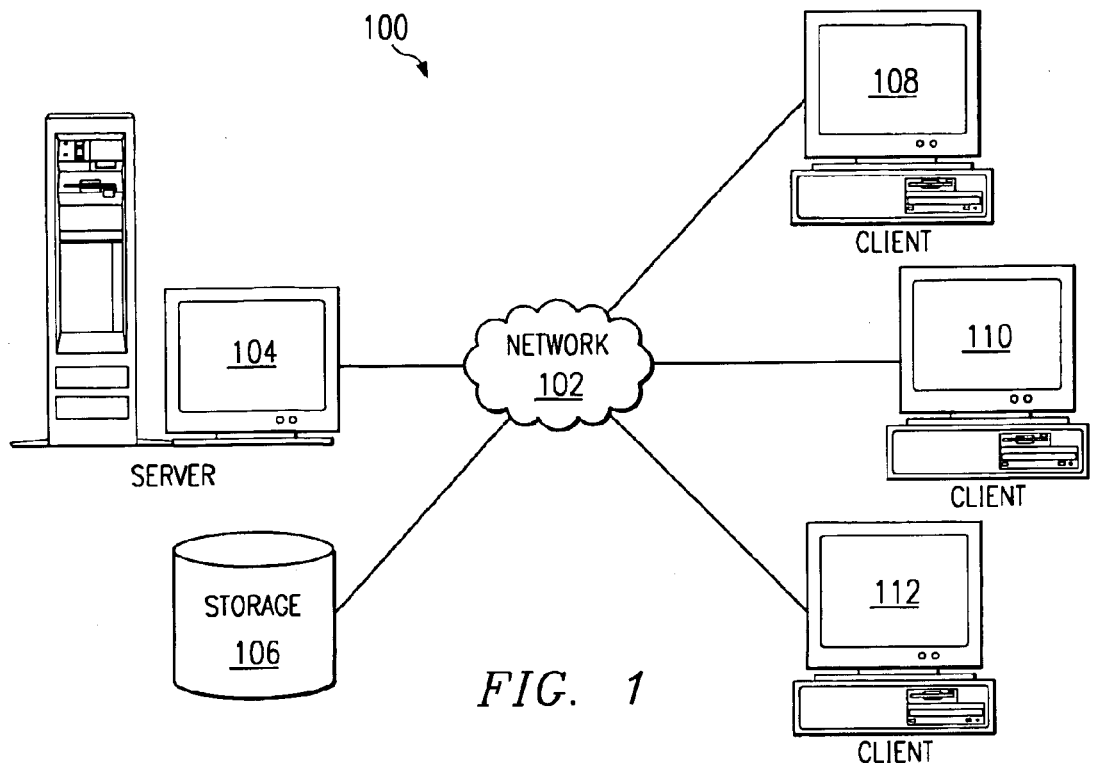
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In the depicted examples, server 104 may contain an electronic mail system from which clients 108, 110, and 112 send and receive e-mail messages. Distributed data processing system 100 may include additional servers, clients, and other devices not shown. For example, messages may be sent and received between server 104 and other servers (not shown) to distribute and receive messages from other clients (not shown).

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
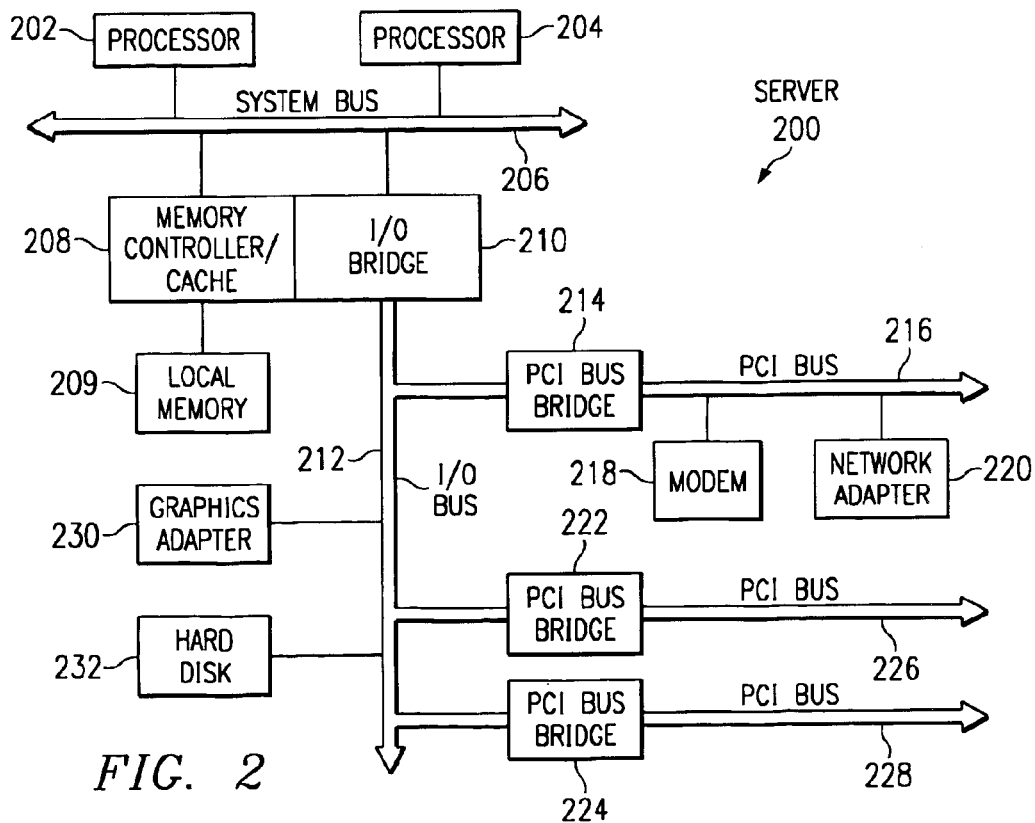
FIG. 2 is a block diagram of a data processing system that may be implemented as a server depicted in accordance with a preferred embodiment of the present invention.

Referring to FIG. 2, a block diagram depicts a data processing system that may be implemented as a server, such as server 104 in FIG. 1, in accordance with a preferred embodiment of the present invention. In the depicted examples, data processing system 200 is used as a electronic mail message server providing service to a number of clients. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
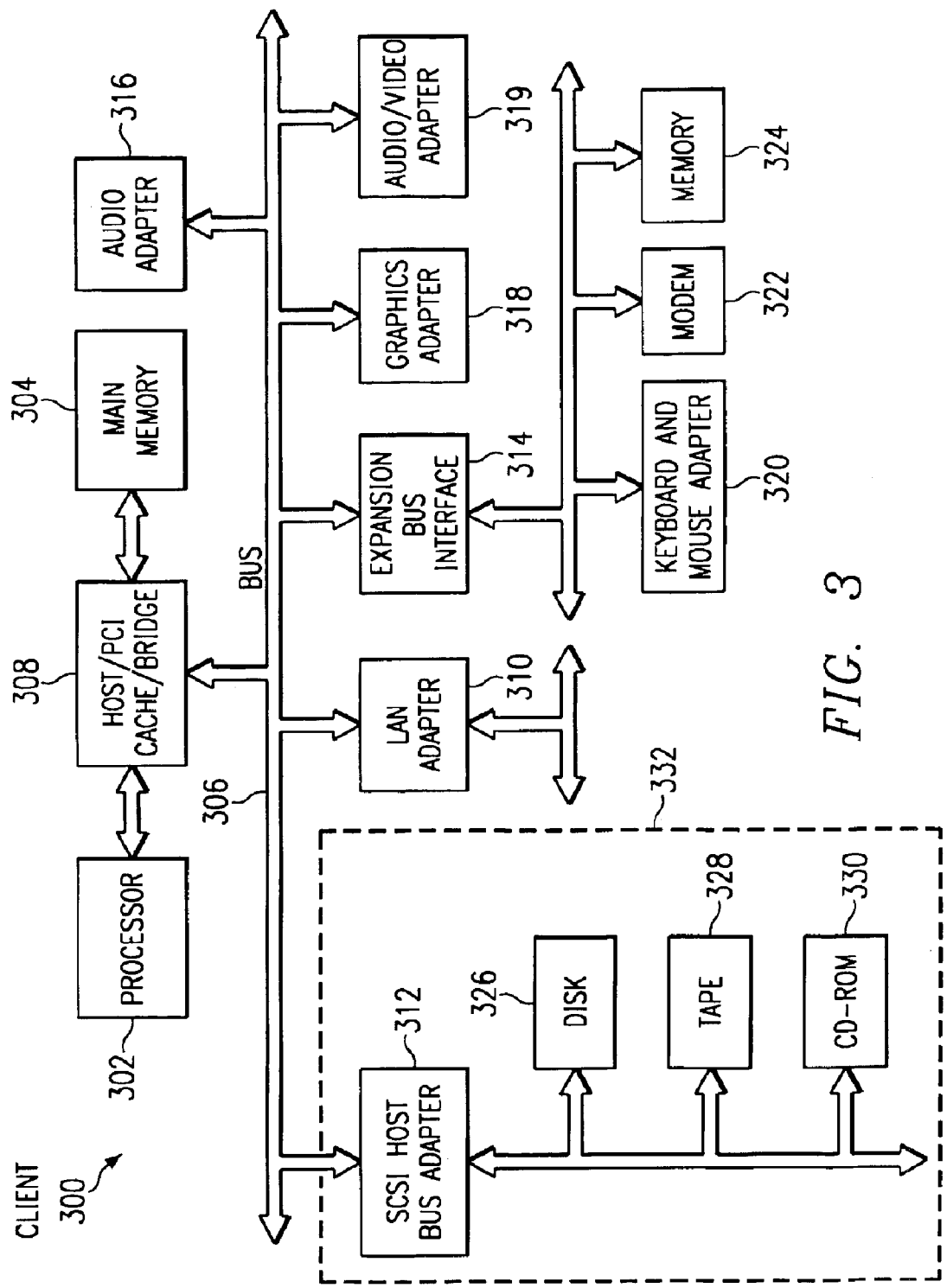
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system ~300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention provides a method, apparatus, and instructions for an improved e-mail system that is customizable for the particular type of content. Specifically, the mechanism of the present invention improves the user experience and effectiveness of sending messages containing different types of content through an e-mail system. The type of mail is identified and alternate optimized views for mail of that type is provided to both create, send, and receive the mail.

Figure 4:
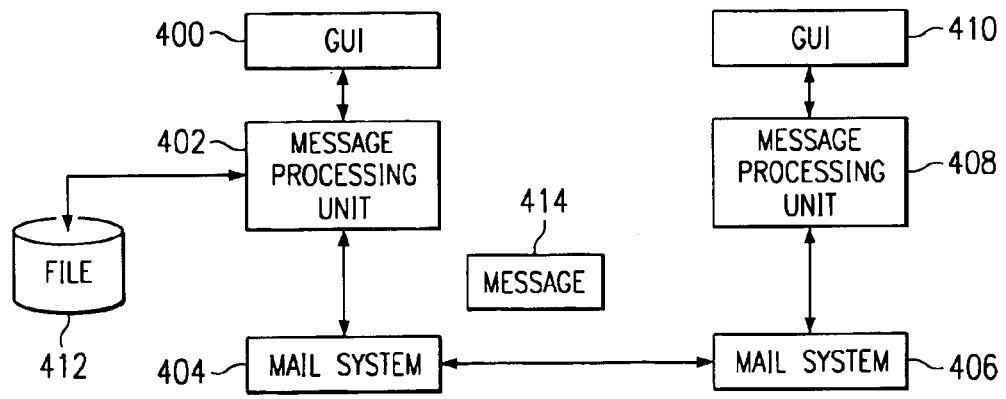
FIG. 4 is a block diagram of a custom messaging system depicted in accordance with a preferred embodiment of the present invention.

With reference now to FIG. 4, a block diagram of a custom messaging system is depicted in accordance with a preferred embodiment of the present invention. In this example, a graphical user interface (GUI) 400 is used in combination with a message processing unit 402 to send customized content. The customized content is sent through mail system 404 to mail system 406 for receipt by message processing unit 408, which provides a customized display in GUI 410 to the user based on the type of content. In this example, GUI 400, message processing unit 402, and mail system 404 may be located at one client while GUI 410, message processing unit 408, and mail system 406 are located at another client in a distributed data processing system. In these examples, mail system 404 and mail system 406 are legacy mail systems while GUI 400, message processing unit 402, GUI 410, and message processing unit 408 implement processes of the present invention. These clients may be implemented using a data processing system, such as data processing system 300 in FIG. 3. GUI 400 and GUI 410 provide customizable interfaces to the user based on the type of content being sent and received by the user. Message processing unit 402 and message processing unit 408 process messages created and received by the user through presently available or legacy mail system processes found in mail system 404 and mail system 406. The legacy mail systems may be implemented using currently available mail systems, such as Lotus Notes or CC Mail, which are available from Lotus Development Corporation. Address lists associated with these mail systems may be accessed by the processes of the present invention in message processing unit 302 or 308 using known interfaces supported by the mail system. For example, Vendor Independent Messaging (VIM) is an example of a known interface support by many mail systems that may be used to access address books as well as initiate various functions, including, for example the sending of mail messages and attaching files to mail messages.

The actual storage and transmission of e-mail, including customized content, is implemented using conventional e-mail data formats and protocols. The separation of these functions are shown for purposes of clearly illustrating the present invention. Of course, depending on the implementation, the processes of the present invention may be implemented directly within a mail system.

A user may initiate the sending of a voice message through GUI 400. A standard text string is placed within a text message by message processing unit 402 in response to initiation of a voice message by the user. This text string is used to identify the e-mail message as a voice message. An example text string may be as follows: "voice message created by Netmate". The user then records a voice message through GUI 400 and message processing unit 402. This voice message is stored as a file 412. When the user has completed recording the voice message and selected a recipient address, an email message 414 is created and file 412 is appended or attached to the e-mail message 414. E-mail message 414 is then sent by mail system 404 to mail system 406. The transfer of e-mail message 414 along with the attached voice message in file 412 is facilitated by one or more mail servers.

When e-mail message 414 is received by mail system 406, message processing unit 408 parses email message 414 for selected text strings that identify the type of content. If the string "voice message created by Netmate" is present within e-mail message 414 and an audio attachment is present, e-mail message 414 will be identified as a customized type, such as a voice message. Message processing unit 408 would then render the mail document in GUI 410 with appropriate optimized views for voice messages. If e-mail message 414 is received by a legacy mail system that is unable to identify customized messages, the message will still be received along with the attached file and the user may still view the message and the attached file through presently available e-mail interfaces. Through the use of the text string, the processes of the present invention allow for customized presentation by e-mail systems enabled to handle customized creation and viewing of e-mail messages while legacy e-mail systems are able to receive these e-mail messages without errors.

Figure 5A:
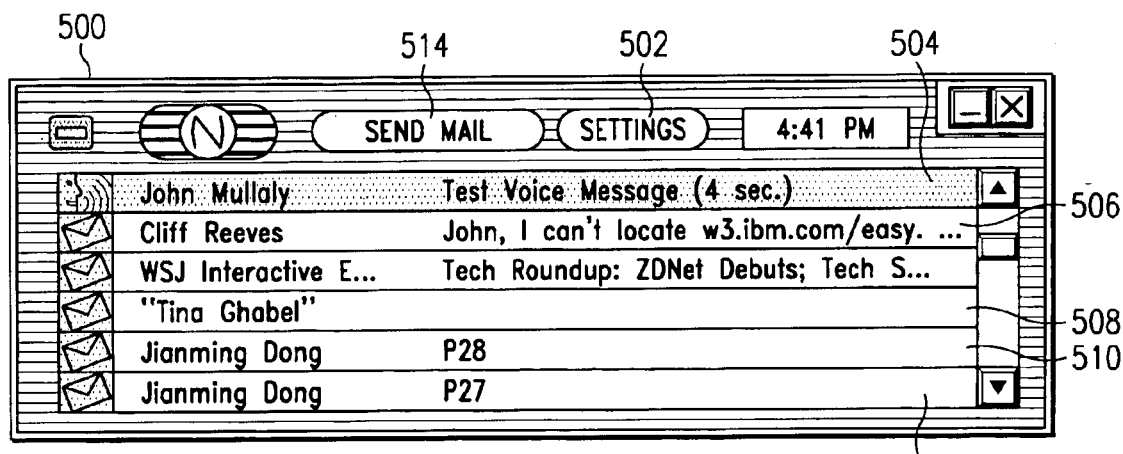

With reference now to FIGS. 5A, 5B, and 6–8, diagrams of graphical user interfaces used in sending and receiving customized e-mail messages are depicted in accordance with a preferred embodiment of the present invention. In FIG. 5A, GUI 500 is an example of a graphical user interface, which allows a user to specify different types of e-mail messages. GUI 500 also includes a settings button 502, which may be used to adjust various parameters for the e-mail program. Also illustrated in GUI 500 are e-mail entries 504–512. In this example, e-mail entry 504 is a voice message while e-mail entries 506–512 are text messages.

Figure 5B:
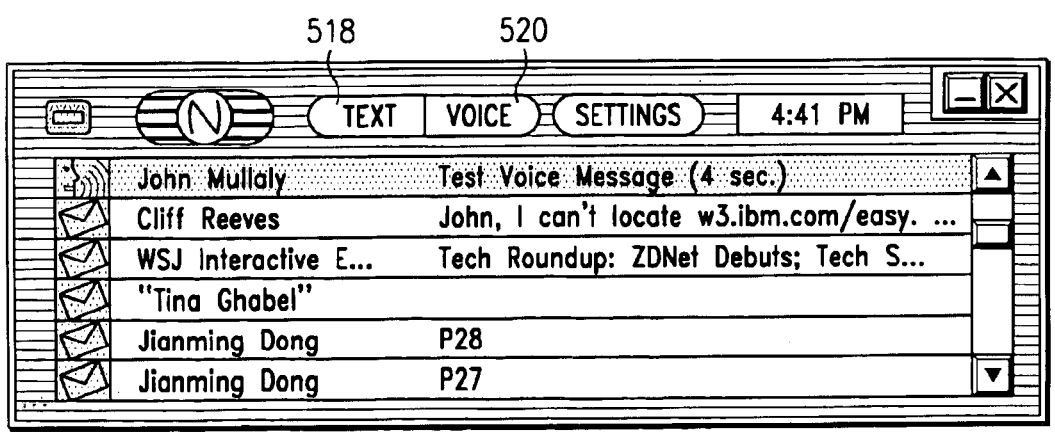
Figure 6:
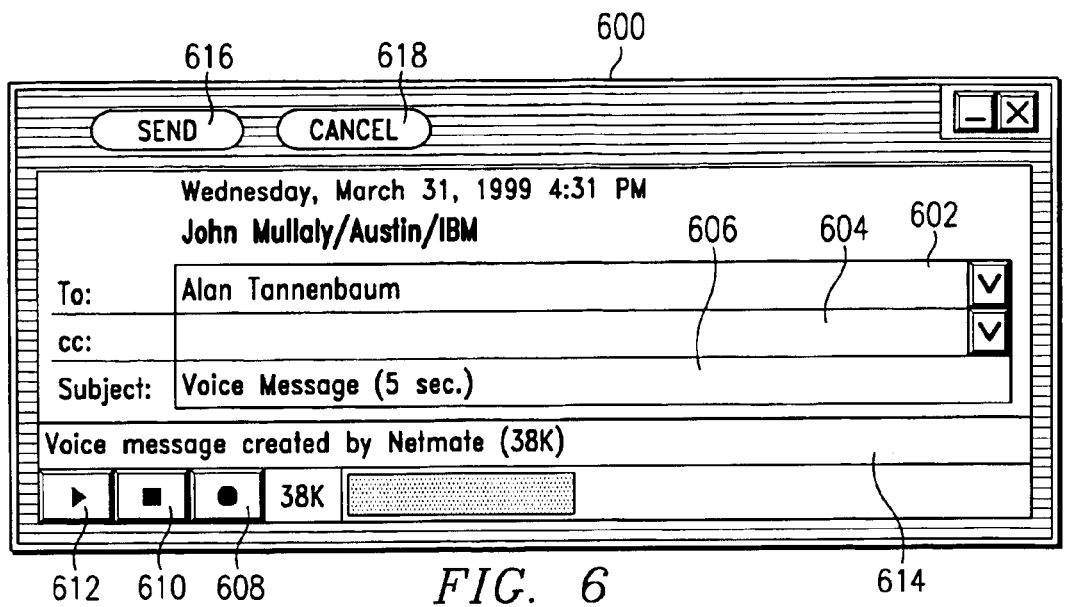

In FIG. 5B, send mail button 514 is replaced with a text button 518 and a voice button 520. In this example, the space taken by send mail button 514 is split between available choices represented by text button 518 and voice button 520. Text button 518 is selected if the user desires to send a text e-mail message. Voice button 520 is selected by the user if a voice message is desired. Selection of voice button 520 results in GUI 600 in FIG. 6 being displayed to the user. GUI 600 in FIG. 6 is optimized for creation of a voice message. As can be seen, GUI 600 contains all of the controls necessary to address the message, record the message, and send the message. GUI 600 does not contain other superfluous controls, such as text formatting buttons and menus to create attachments as are found in other e-mail systems. In this example, GUI 600 includes a "to" field 602 that is used to enter the recipient of the voice message. "CC" field 604 is used for carbon copies while "subject" field 606 is used to indicate a subject for the voice message. The voice message may be recorded by selecting record button 608. The recording may be stopped by pressing stop button 610. The recorded message may be played back by pressing play button 612. Text string field 614 illustrates the string that will be placed within the message to identify the message as a voice mail message.

If the user is satisfied with the recorded message, selecting send button 616 will cause the message to be sent to the recipient identified in "to" field 602 and to any recipients identified in "CC" field 604. If the user decides not to send the message, the operation may be cancelled by selecting cancel button 618.

Figure 7:
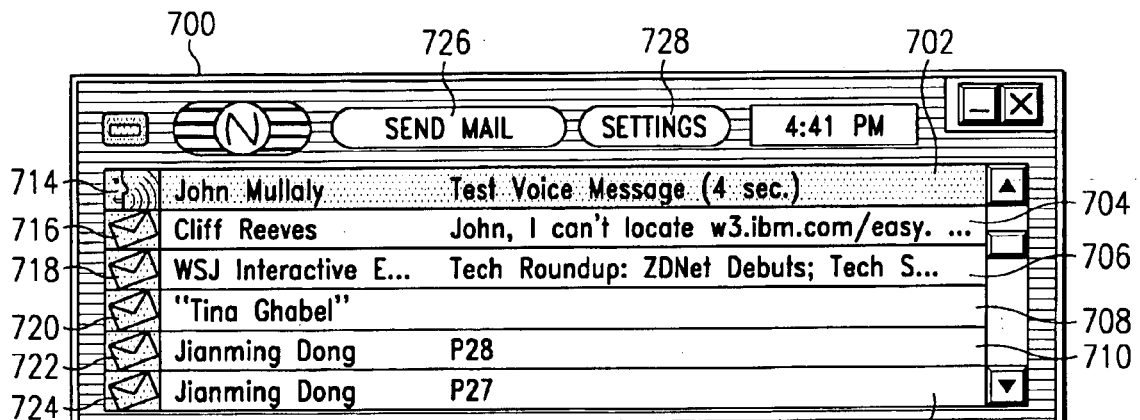

In FIG. 7, GUI 700 illustrates optimized views for customized content. Specifically, GUI 700 renders voice messages in a mail box or a list of new mail with a particular icon to differentiate voice messages from text messages for the user. Entries 702–712 are e-mail messages received by the user. In this example, the e-mail message in entry 702 is a voice message while the e-mail messages in entries 704–712 are text messages. The differentiation between voice and text is indicated graphically. Entry 702 is differentiated from entries 704–712 by icon 714 and icons 716–724. Icon 714 indicates the presence of a voice message while icons 716–724 indicate the presence of a text message. Messages also may be sent from GUI 700 by selecting send mail button 726 and settings may be adjusted by selecting settings button 728.

Figure 8:
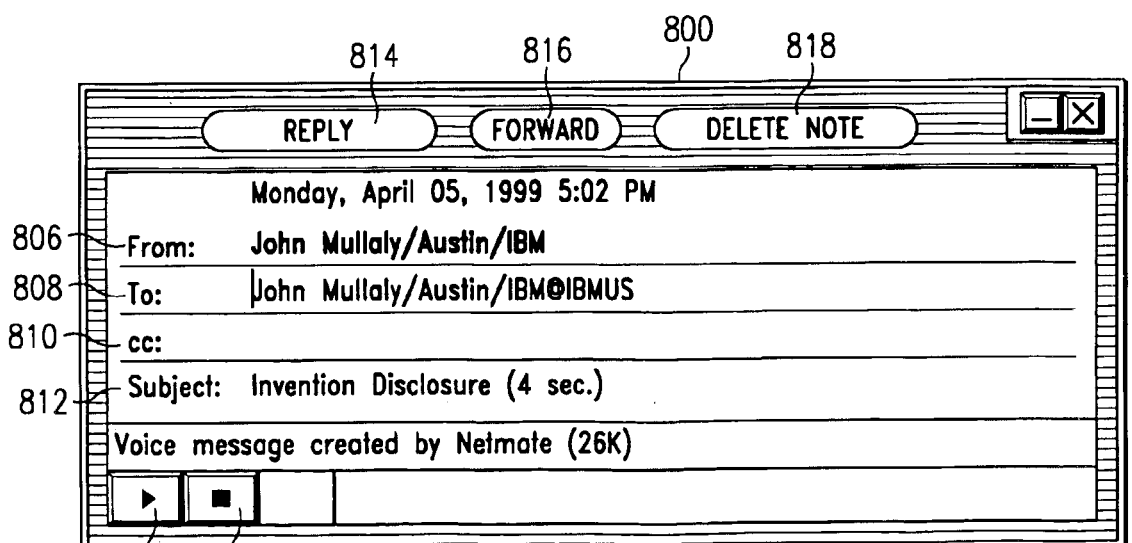

Selection of entry 702 results in GUI 800 in FIG. 8 being displayed to the user. The user may playback the message by selecting play button 802 and may stop playback of the message by selecting stop button 804. The sender of the voice message is found in "from" field 806 while the recipient of the voice message is identified in "to" field 808. Other recipients of the voice message may be identified in "CC" field 810. The subject of the message may be placed in "subject" field 812. The subject of the message is found in "subject" field 812, which also identifies the length of the voice message. GUI 800 also may be used to reply to messages by selecting reply button 814. The voice message may be forwarded to another person by selecting forward button 816. The voice message may be deleted by selecting delete note button 818.

Turning next to FIG. 9, a flowchart of a process for creating and sending custom voice messages is depicted in accordance with a preferred embodiment of the present invention. The processes illustrated in FIG. 9 may be implemented in GUI 400 and message processing unit 402 in FIG. 4. Although this example illustrates the creating and sending of custom voice messages, the processes illustrated in FIG. 9 may be applied to other types of custom messages, such as, for example, custom messages for commercial transactions, such as a stock trade.

The process begins by waiting for user input (step 900). Upon receiving a user input to initiate an outgoing voice message (step 902), the process will then create a custom window for creating voice messages (step 904). Standard text for voice messages are appended or inserted into a standard text e-mail message (step 906). Thereafter, the process waits for user input (step 908).

Upon receiving user input to input a recipient or recipients (step 910), the recipient or recipients are stored (step 912). These recipients are in the form of e-mail addresses or selections from an address book in an e-mail system. Thereafter, the process returns to step 908 to await further user input.

When a subject user input is selected (step 914) the subject for the e-mail message is stored (step 916) with the process then returning to step 908. Upon receiving user input to input a message (step 918), the process stores a voice recording in a file system (step 920) with the process then returning to step 908 to await further user input. Upon receiving user input to send the voice message (step 922), a determination is made as to whether requirements have been satisfied (step 924). These requirements are those needed to send the voice message. For example, at least one recipient is required before the message can be sent. Further, a voice recording also must have been made and stored by the user. The subject matter of the message may be optional. If all of the requirements have not been satisfied, an error message is displayed to the user (step 926). This error message may include an indication of unsatisfied requirements that must be met to send the voice message. Thereafter, the process returns to step 908.

If all of the requirements are met in step 924, the custom message window is closed (step 928). An outgoing message is created in the mail system (step 930). Then, the values for the recipient and the subject are sent to the mail system for placement in the outgoing message (step 932). A standard text string identifying the voice message is appended to or placed within the body of the outgoing message (step 934). The recorded voice file is appended to the outgoing message as an attachment (step 936). Thereafter, the message is sent (step 938) with the process then returning to step 900 to wait for user input.

With reference again to step 908, if the user input is to cancel the message (step 940) the custom message window is then closed (step 942) with the process then returning to step 900.

With reference again to step 900, the process will accept other user input (step 944), process the user input (step 946) and then return to step 900. This other input may be for other types of customized messages or for a standard text message. Examples of other input that may occur in step 944 are creating a text message, opening a received message, and deleting a message. Upon receiving a user input to end the system (step 948), the process will then terminate.

With reference now to FIG. 10, a flowchart of a process for receiving custom voice messages is depicted in accordance with a preferred embodiment of the present invention. The process begins by checking for new messages (step 1000). This step involves querying the mail server to determine whether new messages are present for the user. A determination is made as to whether new messages are present (step 1002). If new messages are not present, a timed delay will occur (step 1004) with the process then returning to step 1000. This timed delay may be set by the system or by the user to determine the amount of time that passes before a check for new messages is made.

If new messages are present, then a variable N is set equal to the number of new messages (step 1006). An index is set equal to 1 (step 1008). A determination is then made as to whether the index is less than or equal to N (step 1010). If the index is not less than or equal to N, the process proceeds to step 1004. Otherwise, the next message is retrieved (step 1012). This message is parsed to determine the message type (step 1014). This step looks for a text string to identify whether customized content is present and the type of customized content. A determination is then made as to whether a text string is present to indicate a voice message (step 1016). If the message is not a voice message, the message is displayed in a message list in a normal fashion for text messages (step 1018). On the other hand, if the message is a voice message, this message is displayed as a voice message in the message list (step 1020). This display may include a selected icon to indicate that the message is a voice message. In either event after displaying the message in the message list, the index is incremented by 1, (step 1022) with the process then returning to step 1010.

With reference now to FIG. 11, a flowchart of a process for displaying custom voice messages to a user is depicted in accordance with a preferred embodiment of the present invention. The process begins by waiting for user input (step 1100). This steps waits for user input to occur on the message list displayed to the user.

If the user input is to open a voice message (step 1102), a custom window for voice messages is displayed to the user (step 1104). The process then waits for user input to the custom window (step 1106). If the user input is to play audio (step 1108), the file attached to the e-mail message is accessed (step 1110). This file is the file containing the voice recording. The audio or voice recording is then presented to the user (step 1112). The display is updated to reflect presentation of the voice recording (step 1114). A determination is then made as to whether the playback has ended (step 1116). If the playback has not ended, the process returns to step 1112 to continue playing the voice recording. Otherwise, the process returns to step 1106 as described above.

With reference again to step 1106, if the user input is some other input (step 1118) that input is processed (step 1120) with the process then returning to step 1106. Examples of other input that may occur in step 1118 include replying, forwarding, and deleting the message. If the user input is a close message input (step 1122), the custom window is closed (step 1124) with the process then returning to step 1100.

With reference again to step 1100, if the input is other input (step 1126) that input is processed (step 1128) with the process then returning to step 1100. This other input may be for example, opening a text message. If the user input is to end the system (step 1130) the process terminates.

Thus, the present invention provides a method, apparatus, and instructions for supporting different types of messages by providing customized GUIs for each particular type of message. The processes of the present invention are compatible with existing e-mail systems through the use of a standard text string to identify customized content. An enabled mail system will examine the message to see if a text string is present that identifies customized content and will process the message accordingly if such a text string is present. An e-mail system without the processes of the present invention will still be able to present the message to the user and allow the user to manipulate attachments through presently available mechanisms.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted example is directed towards voice messages as a type of content, the present invention may be applied to other types of content. For example, a stock trade may be a particular type of message. With a stock trade message, the GUI would provide customized controls and inputs used to facilitate trading of stocks. Further, authentication information and authorization information in the form of certificates and/or keys may be attached as a file to the e-mail message. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing voice messages, the method comprising the data processing system implemented steps of:

responsive to a request from a user to record a voice message, presenting a graphical user interface for composing a text message, wherein the graphical user interface includes a recipient field for entering a recipient address and controls for recording a voice message;

responsive to the user entering a recipient address in the recipient field and recording a voice message using the controls, forming a text message to be sent to the recipient address;

responsive to a request to send the text message, automatically inserting an indicator into the text message indicating a presence of a voice message;

responsive to the request to send the text message, automatically appending the voice message to the text message to form an appended voice message; and sending the text message with the appended voice message to the recipient address, wherein upon receipt of the text message at the recipient, the text message is displayed as a voice message in a message list containing non-voice messages.

2. The method of claim 1 further comprising:

receiving the text message to form a received text message;

parsing the received text message for a presence of an indicator indicating that the received text message is a voice message; and responsive to a presence of the indicator, presenting controls to listen to the voice message.

3. The method of claim 1, wherein the text message is an electronic mail message.

4. The method of claim 1, wherein the indicator is a text string.

5. The method of claim 1, wherein the data processing system is a personal computer.

6. The method of claim 1, wherein the data processing system is a work station.

7. The method of claim 1, wherein the data processing system is a personal digital assistant.

8. The method of claim 1, wherein the step of automatically inserting an indicator into a text message comprises inserting the indicator into a body of the text message.

9. A messaging system for use in a data processing system, the messaging system comprising:

a graphical user interface, wherein the graphical user interface provides selections for user input to create and send voice messages; and a message processing mechanism, wherein the message processing mechanism has a plurality of modes of operation including:

a first mode of operation in which the message processing mechanism waits for a user input;

a second mode of operation, responsive to a user input in the first mode of operation to record a voice message, in which the message processing mechanism presenting a graphical user interface for composing a text message, wherein the graphical user interface includes a recipient field for entering a recipient address and controls for recording a voice message;

a third mode of operation, responsive to a user input in the first mode of operation to enter a recipient address for the voice message, in which the message processing mechanism receives entry of a recipient address for the voice message;

a fourth mode of operation, responsive to a user recording the voice message using the controls, in which the message processing mechanism stores the voice message in a file; and a fifth mode of operation, responsive to a user input in the first mode of operation to send the voice message and to a presence of a recipient address for the voice message, in which the message processing mechanism creates a text message, inserts an identifying string that identifies a presence of the voice message in the text message, appends the file to the text message, and sends the text message to the recipient address;

a sixth mode of operation in which the message processing mechanism waits for a receipt of a text message;

a seventh mode of operation, responsive to receiving a text message, in which the message processing mechanism parses the text message to determine whether an identifying string identifying a presence of a voice message is present; and an eight mode of operation, responsive to a presence of the identifying string, in which the message processing mechanism causes the graphical user interface to display the message as a voice message in a message list containing non-voice messages.

10. A data processing system for processing voice messages, the data processing system comprising:

presentation means, responsive to a request from a user to record a voice message, for presenting a graphical user interface for composing a text message, wherein the graphical user interface includes a recipient field for entering a recipient address and controls for recording a voice message;

forming means, responsive to the user entering a recipient address in the recipient field and recording a voice message using the controls, for forming a text message to be sent to the recipient address, inserting means, responsive to a request from the user to send the text message, for automatically inserting an indicator into the text message indicating a presence of a voice message;

appending means, responsive to the request to send the text message, for automatically appending the voice message to the text message to form an appended voice message; and sending means for sending the text message with the appended voice message to the recipient address, wherein upon receipt of the text message at the recipient, the text message is displayed as a voice message in a message list containing non-voice messages.

11. The data processing system of claim 10 further comprising:

receiving means for receiving the text message to form a received text message;

parsing means for parsing the received text message for a presence of an indicator indicating that the received text message is a voice message; and presenting means, responsive to a presence of the indicator, for presenting controls to listen to the voice message.

12. The data processing system of claim 10, wherein the text message is an electronic mail message.

13. The data processing system of claim 10, wherein the indicator is a text string.

14. The data processing system of claim 10, wherein the data processing system is a personal computer.

15. The data processing system of claim 10, wherein the data processing system is a work station.

16. The data processing system of claim 10, wherein the data processing system is a personal digital assistant.

17. The data processing system of claim 10, wherein the inserting means comprises means for inserting the indicator into a body of the text message.

18. A computer program product in a computer readable medium for processing voice messages, the computer program product comprising:

first instructions, responsive to a request from a user to record a voice message, for presenting a graphical user interface for composing, a text message, wherein the graphical user interface includes a recipient field for entering a recipient address and controls for recording a voice message;

second instructions, responsive to the user entering a recipient address in the recipient field and recording a voice message using the controls, for forming a text message to be sent to the recipient address;

third instructions, responsive to a request from the user to send the text message, for automatically inserting an indicator into the text message indicating a presence of a voice message;

fourth instructions, responsive to the request to send the text message, for automatically appending the voice message to the text message to form an appended voice message; and fifth instructions for sending the text message with the appended voice message to the recipient address, wherein upon receipt of the text message at the recipient, the text message is displayed as a voice message in a message list containing non-voice messages.

19. The computer program product of claim 18 further comprising:

sixth instructions for receiving the text message to form a received text message;

seventh instructions for parsing the received text message for a presence of an indicator indicating that the received text message is a voice message; and eighth instructions, responsive to a presence of the indicator, for presenting controls to listen to the voice message.

* * * * *